United States Patent
Cooper et al.

(10) Patent No.: US 7,146,192 B2
(45) Date of Patent: Dec. 5, 2006

(54) BASE STATION FOR MOBILE TELECOMMUNICATIONS, AN ANTENNA ASSEMBLY, AND A METHOD OF DETERMINING THE LOCATION OF AN ANTENNA ASSEMBLY

(75) Inventors: Stephen Edward Cooper, Swindon (GB); Neil Gordon Grant, Swindon (GB)

(73) Assignee: Lucent Technologies Inc., Murray Hill, NJ (US)

(*) Notice: Subject to any disclaimer, the term of this patent is extended or adjusted under 35 U.S.C. 154(b) by 445 days.

(21) Appl. No.: 10/458,566

(22) Filed: Jun. 10, 2003

(65) Prior Publication Data
US 2004/0253985 A1 Dec. 16, 2004

(51) Int. Cl.
H04Q 7/30 (2006.01)
(52) U.S. Cl. ............... 455/562.1; 455/423; 455/67.11; 455/456.1
(58) Field of Classification Search ............ 455/562.1, 455/561, 422.1, 423, 424, 25, 524, 67.11, 455/456.1, 0.6, 90.3; 342/357.1, 3, 357.06
See application file for complete search history.

(56) References Cited

U.S. PATENT DOCUMENTS

| | | | |
|---|---|---|---|
| 5,838,237 A | 11/1998 | Revell et al. ............... 340/573 |
| 5,913,170 A * | 6/1999 | Wortham ................ 455/561 X |
| 5,953,384 A | 9/1999 | Walsh et al. ................ 375/354 |
| 6,449,485 B1 * | 9/2002 | Anzil ...................... 455/456.1 |
| 2003/0083103 A1 * | 5/2003 | Drawert ...................... 455/561 |
| 2004/0202139 A1 * | 10/2004 | Gutowski et al. .... 455/456.1 X |

FOREIGN PATENT DOCUMENTS

| | | |
|---|---|---|
| EP | 0 794 682 | 9/1997 |
| WO | WO 01/93460 | 12/2001 |
| WO | WO 03/056873 | 7/2003 |

* cited by examiner

Primary Examiner—Matthew D. Anderson
Assistant Examiner—Philip J. Sobutka (57) ABSTRACT

A base station for mobile telecommunications comprises a main body and an antenna assembly mounted in a position at a distance from the main body. The antenna assembly comprises at least one antenna for transmission to and reception of signals from mobile user terminals. The antenna assembly further comprises a receiver for determining position from satellite signals so as to determine the location of the antenna assembly.

19 Claims, 6 Drawing Sheets

BASE STATION FOR MOBILE TELECOMMUNICATIONS, AN ANTENNA ASSEMBLY, AND A METHOD OF DETERMINING THE LOCATION OF AN ANTENNA ASSEMBLY

TECHNICAL FIELD

The present invention relates to a base station for mobile telecommunications comprising a main body and an antenna assembly mounted in a position at a distance from the main body. The present invention also relates to an antenna assembly for a base station. The present invention also relates to a method of determining the location of an antenna assembly.

BACKGROUND OF THE INVENTION

Accurate knowledge of both antenna location and Radio Frequency (RF) feeder cable length between a base station and its antenna in a cellular radio system are necessary for the implementation of location based services.

The length of the feeder cable must be known because of the timing delay that it introduces and also to estimate the insertion loss of the feeder cable for the purposes of calculating appropriate transmit and receive power. It is possible to determine feeder cable length manually during cell site installation or upgrade, but this is time consuming, expensive, and prone to inaccuracy and human error.

Figure 1:
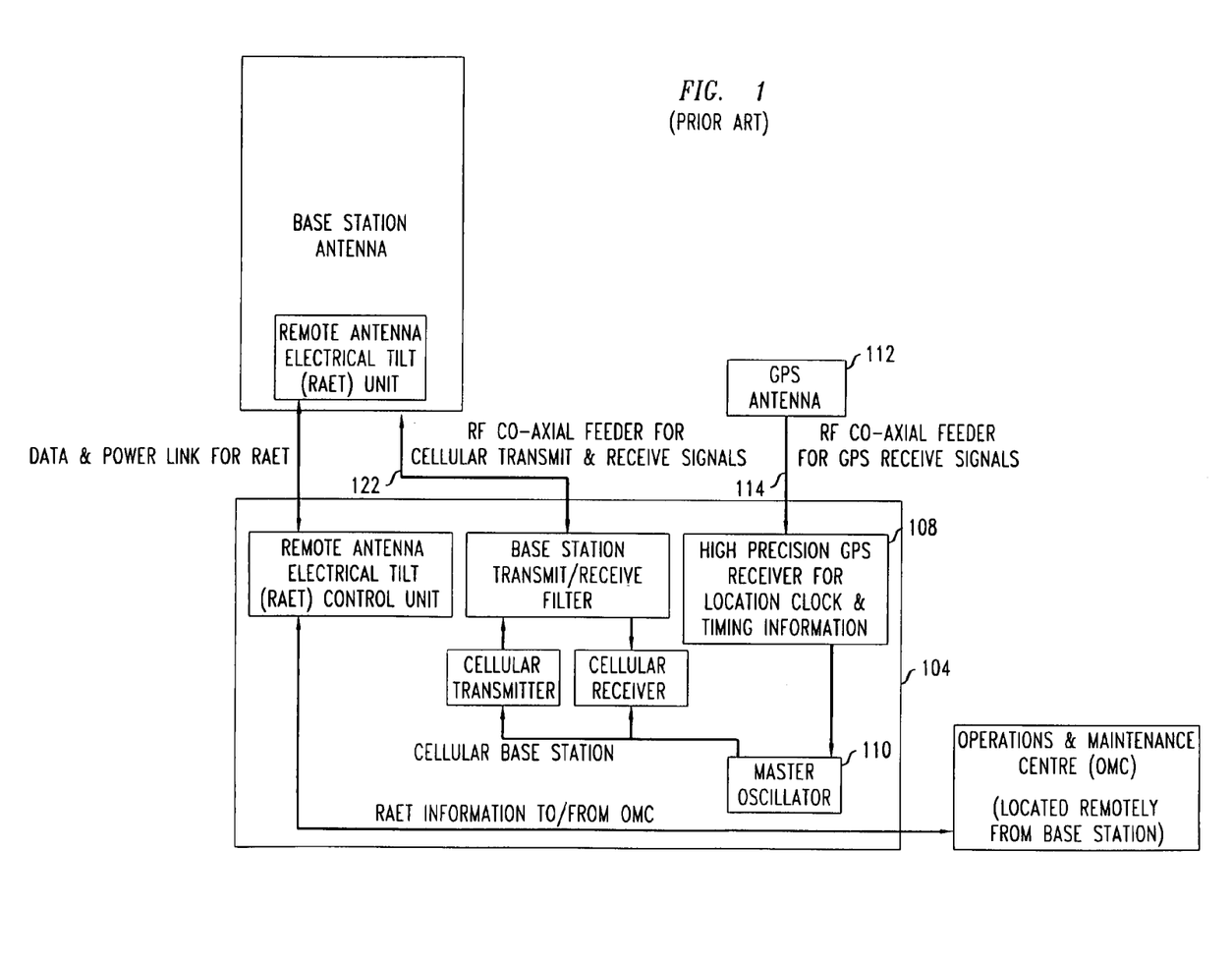
FIG. 1 is a diagram illustrating a known cellular-base station (Prior Art)

Antenna location may be determined from an accurate map but this is unlikely to be accurate enough and information on height is likely to be poor. A stand-alone Global Positioning System (GPS) receiver can be used to give an accurate determination of location in three dimensions, but requires a long time to minimise errors. Alternatively, some known base stations incorporate a GPS receiver in the main body (e.g. cabinet) of the base station. An example of such a known cellular base station is shown in FIG. 1. The base station contains a high-accuracy (high-cost) GPS receiver 108, which is used as a reference for the base station's master oscillator 10 (which is itself used as a high precision timing reference for the base station 104). The length of the RF co-axial feeder cable 114 between the GPS antenna 112 and the GPS receiver 108 can be considered to be negligible. The main RF co-axial feeder cable 122 for cellular transmit and receive signals is much longer and is of a length that is not known accurately before installation.

After installation, feeder cable length is known to be measured using Time Domain Reflectometry (TDR), but the test equipment is expensive and requires a trained operator. Feeder cable length is also difficult to measure using other known methods, once the feeder cable is installed. Inaccuracy due to human error is also a serious concern.

SUMMARY OF THE INVENTION

A base station, an antenna assembly and a method according to the present invention are defined in the independent claims to which the reader should now refer. Preferred features are laid out in the dependent claims.

An example of the present invention is a base station for mobile telecommunications comprising a main body and an antenna assembly mounted in a position at a distance from the main body. The antenna assembly comprises at least one antenna for transmission to and reception of signals from mobile user terminals. The antenna assembly further comprises a receiver for determining position from satellite signals so as to determine the location of the antenna assembly.

The receiver for determining position from satellite signals is preferably a Global Positioning System (GPS) receiver. GPS receivers in the form of chipsets are cheap and easy to install.

The main body of the base station preferably comprises a second receiver of satellite signals. The base station then further comprises a comparison unit so as to compare the positions of said two receivers, or timings of output signals from the two receivers corresponding to a pulsed satellite signal. This is so as to estimate the length of, or time delay in conducting signals caused by, the cable connecting the main body and antenna assembly. Accurate knowledge of both (a) the time delay caused by the feeder cable, which is related to the feeder cable length by a known factor, and (b) antenna location enables location based services to be provided with a high degree of accuracy. Location based services are such as "E-911" which is emergency location of a mobile user terminal (as used in the USA).

The present invention also provides an antenna assembly. An example is an antenna assembly for a base station for mobile telecommunications in use mounted in a position at a distance from the main body of the base station. The antenna assembly comprises at least one antenna for transmission to and reception of signals from mobile user terminals. The antenna assembly further comprises a receiver for determining position from satellite signals so as to determine the location of the antenna assembly.

The present invention also provides a method of determining the location of an antenna assembly. An example is a method of determining the location of an antenna assembly where a base station for mobile telecommunications comprises a main body and the antenna assembly. The antenna assembly is mounted in a position at a distance from the main body. The antenna assembly comprises at least one antenna for transmission to and reception of signals from mobile user terminals. The antenna assembly further comprises a receiver which determines position from satellite signals.

BRIEF DESCRIPTION OF THE DRAWINGS

Preferred embodiments of the present invention will now be described by way of example and with reference to the drawings, in which.

DETAILED DESCRIPTION

Figure 2:
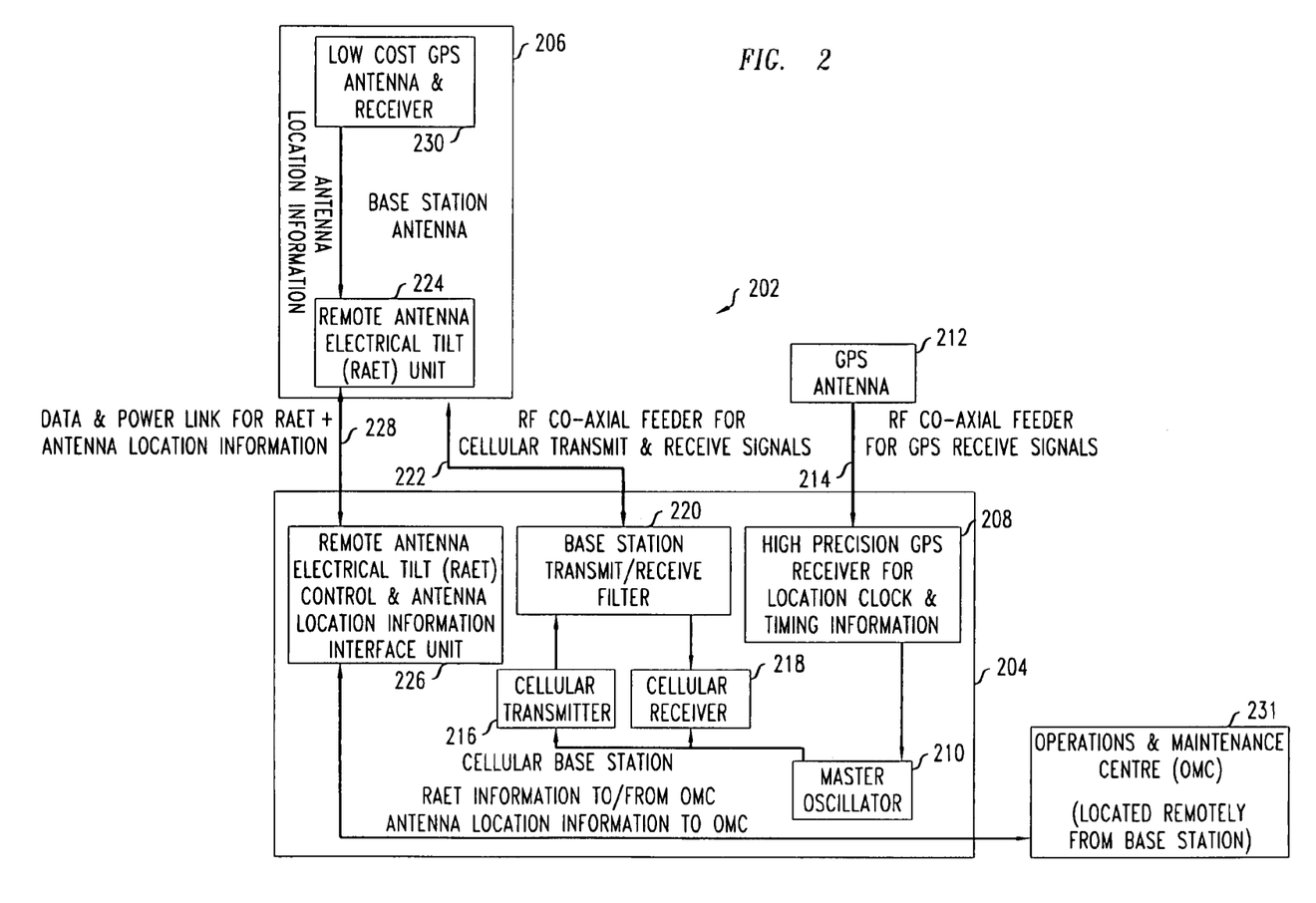
FIG. 2 is a diagram illustrating a preferred base station with location determination of its antenna assembly.

FIG. 2 shows a preferred base station 202 enabling location determination of its antenna assembly 206. The base station 202 consists of a main body 204 positioned at the base of a tower (not shown) and a tower-mounted antenna assembly 206. The main body contains a high-accuracy (high-cost) GPS receiver 208, which is used as a timing reference for the base station's master oscillator 210 (used as a high precision frequency reference for the base station 202) also within the main body 204. The high-quality GPS receiver 208 has its own associated antenna 212 connected by a co-axial cable 214. The main body 204 also includes transmitter circuitry 216 and receiver circuitry 218 connected to a transmit/receive filter 220, which is connected via a co-axial feeder cable 222 to the tower-mounted antenna assembly 206. The antenna assembly 206 includes a remote antenna electrical tilt (RAET) unit 224 having a data/power connection cable 228 back to its control unit 226 in the main body 204 of the base station 222.

Determination of Location of Antenna Assembly

As also shown in FIG. 2, a low cost GPS receiver 230 including an associated antenna is incorporated into the antenna assembly 206. The low cost GPS receiver 230 provides antenna location information which is transferred to the main body 204 of the base station 202 via a RAET Data link 228, the control unit 226 acting also as an antenna location information interface unit. (In systems with remote antenna electrical tilt (RAET), also known as remote antenna electrical down tilt (RAEDT) and remote electrical tilt (RET), it is already necessary to have a data/power connection to the antenna, and this is used here to also transfer the antenna location information.)

The control unit 226 of the base station 202 sends the antenna location information to a remotely located Operations & Maintenance Centre (OMC) 231. If the antenna location information is only monitored for a short period of time, it is liable to inaccuracies, so accordingly long term averaging of the antenna location information allows a more accurate determination of the antenna's exact position This averaging is performed in the low cost GPS Receiver 230.

As an added bonus, monitoring for sudden changes in antenna assembly position at the OMC 231 may help detect storm damage or vandalism.

The data link 228 for Remote Antenna Electrical Tilt (RAET), between the base station's main body 204 and the antenna assembly 206, may be implemented in a number of ways, such as using Serial Data (RS232, RS422, RS485 etc.) cables, ethernet cable or an optical fibre link.

In an alternative embodiment (not shown) a dedicated link for the antenna location information is employed to transfer the antenna location information to the main body of the base station rather than using the RAET Data/power link as in FIG. 2.

In an alternative embodiment (not shown) the dedicated RAET data link is done away with, the RAET data signals and power supply signal being superimposed on to the coaxial feeder cable between the transmit/receive filter of the main body and the antenna assembly, i.e as a modulated RF sub-carrier signal.

In alternative embodiments (not shown), the long term averaging of antenna location information is undertaken in the main body of the base station, or in the Operations & Maintenance Centre (OMC).

Feeder Cable Length Determination

By placing a second satellite positioning receiver in the base station namely in the main body (e.g. cabinet), antenna feeder length may be accurately determined by comparing timing delay and location information of the output signals between the two GPS receivers (i.e. antenna vs. cabinet) in a timing and location comparison unit.

Figure 3:
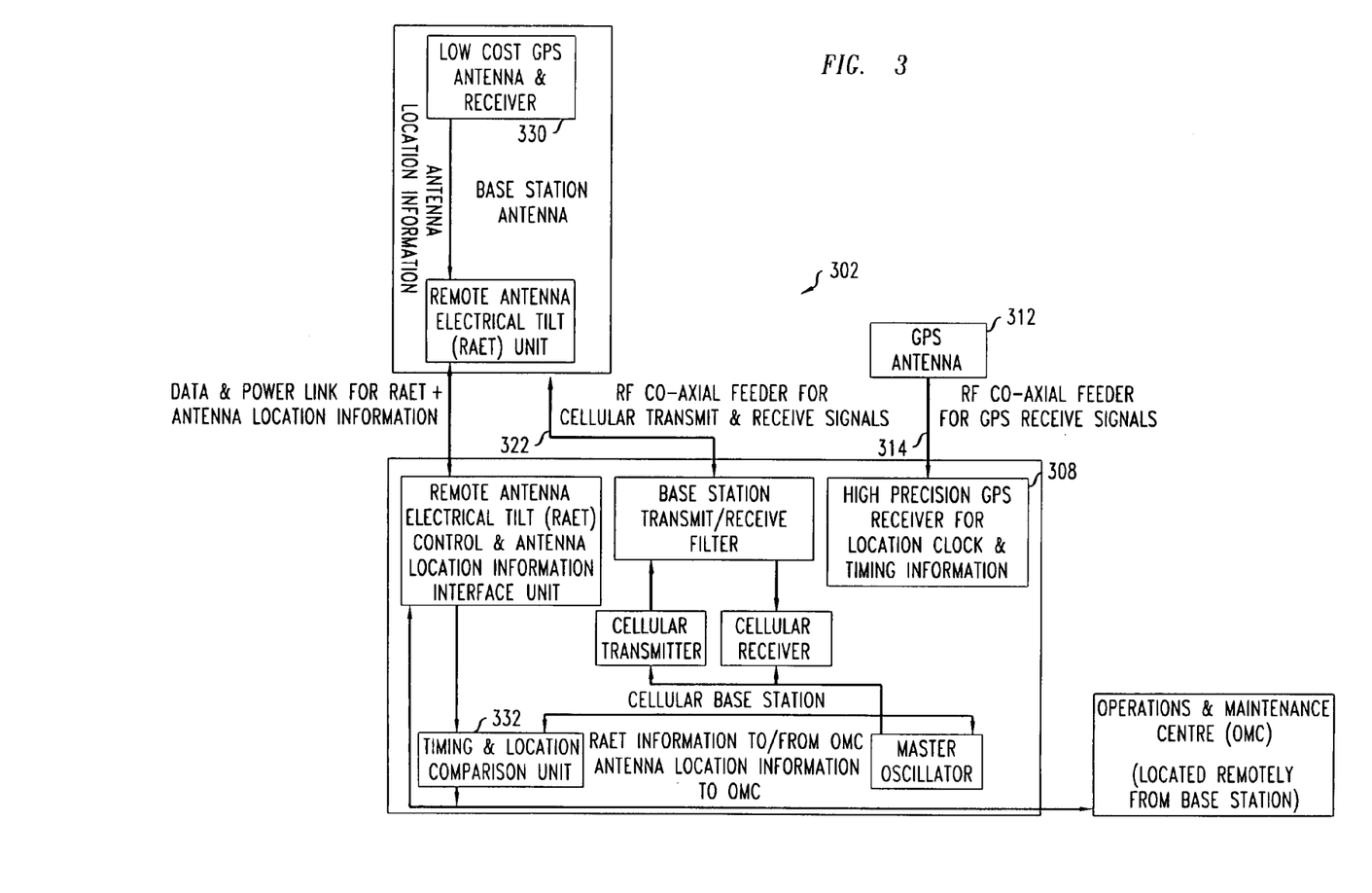
FIG. 3 is a diagram illustrating a further preferred base station with determination of antenna assembly location and feeder length.

FIG. 3 shows a further base station 302 which is basically the same as the base station shown in FIG. 2 but involves determination not only of antenna assembly location, but also of the length of the feeder cable 322.

To determine feeder cable 322 length, the output signals from the high precision GPS receiver 308 and the low cost GPS receiver 330 are compared in a timing and location comparison unit 332. An estimate of feeder cable 322 length is calculated by comparing timing difference between the output signals of the two GPS receivers 330 and 308 corresponding to a pulsed GPS input signal. This is possible since electrical or optical signals are known to travel more slowly in the cable 322 than through the air (free space). For cable 322 that is co-axial cable, this ratio (velocity in cable/velocity in free space) is called the velocity factor and is known. For a similar embodiment (not shown) where the cable 322 is an optical fibre, the inverse ratio (velocity of light in free space/velocity of light in glass fibre) is, of course, the refractive index, and is known.

A rough estimate of length of the feeder cable 322 is also determined by comparing the distance between the locations (in 3 spatial dimensions, X, Y & Z) of the two GPS antennas 330,308, after long term averaging of the location data from each. Provided the estimate from the timing difference agrees with this rough estimate, the estimate from the timing difference is taken as correct.

For accuracy, the length of cable 314 that connects the high precision GPS receiver 308 to its own antenna 312 should be as short as possible, and ideally, should be of known length so as to be compensated for.

In an alternative embodiment (not shown) similar to the FIG. 3 embodiment, the dedicated RAET data link is done away with, the RAET data signals and power supply signal being superimposed on to the coaxial feeder cable between the transmit/receive filter of the main body and the antenna assembly, i.e as a modulated RF sub-carrier signal.

Base Stations with More Processing Circuitry Being Tower-Mounted

Figure 4:
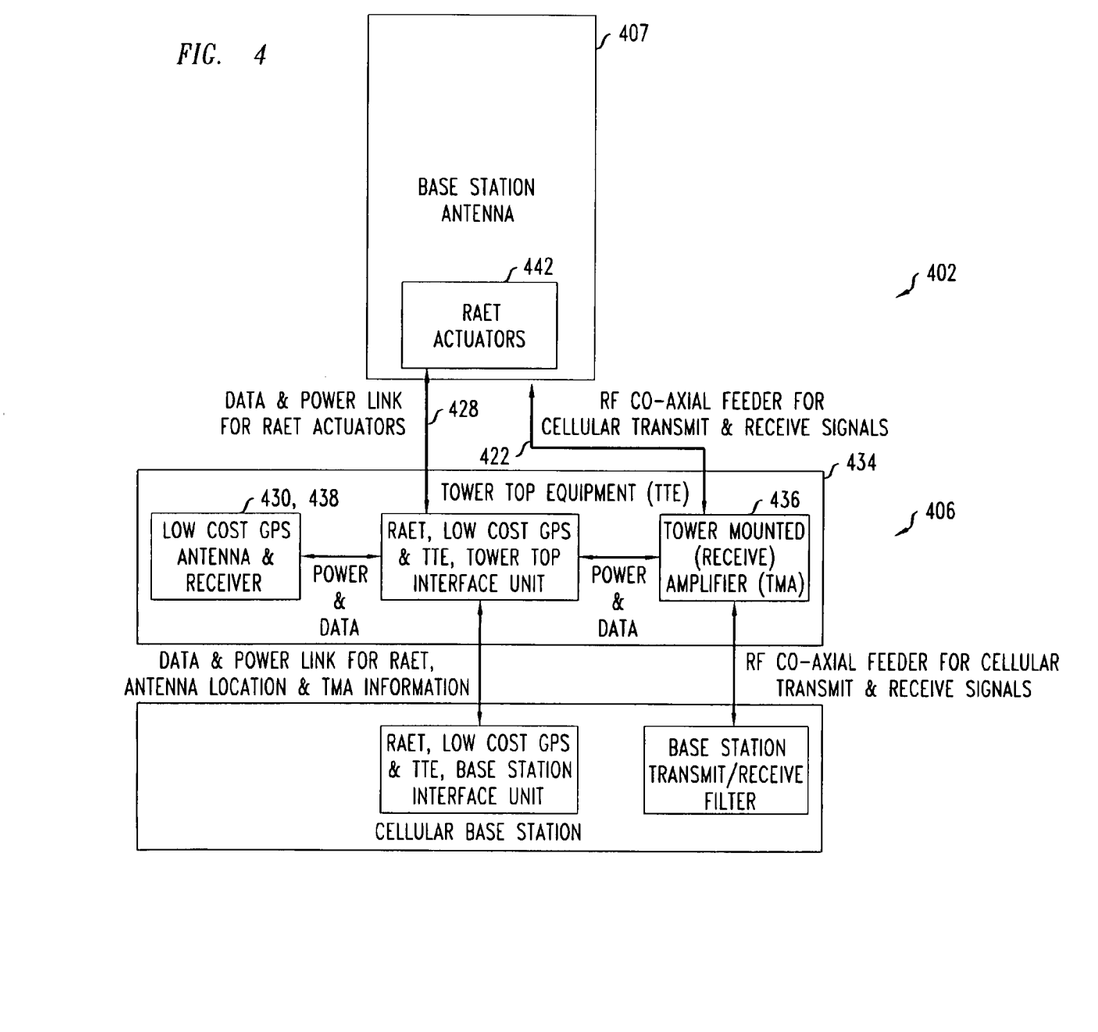
FIG. 4 is a diagram illustrating a further preferred base station in which tower top equipment includes a low cost GPS receiver and its associated antenna.
Figure 5:
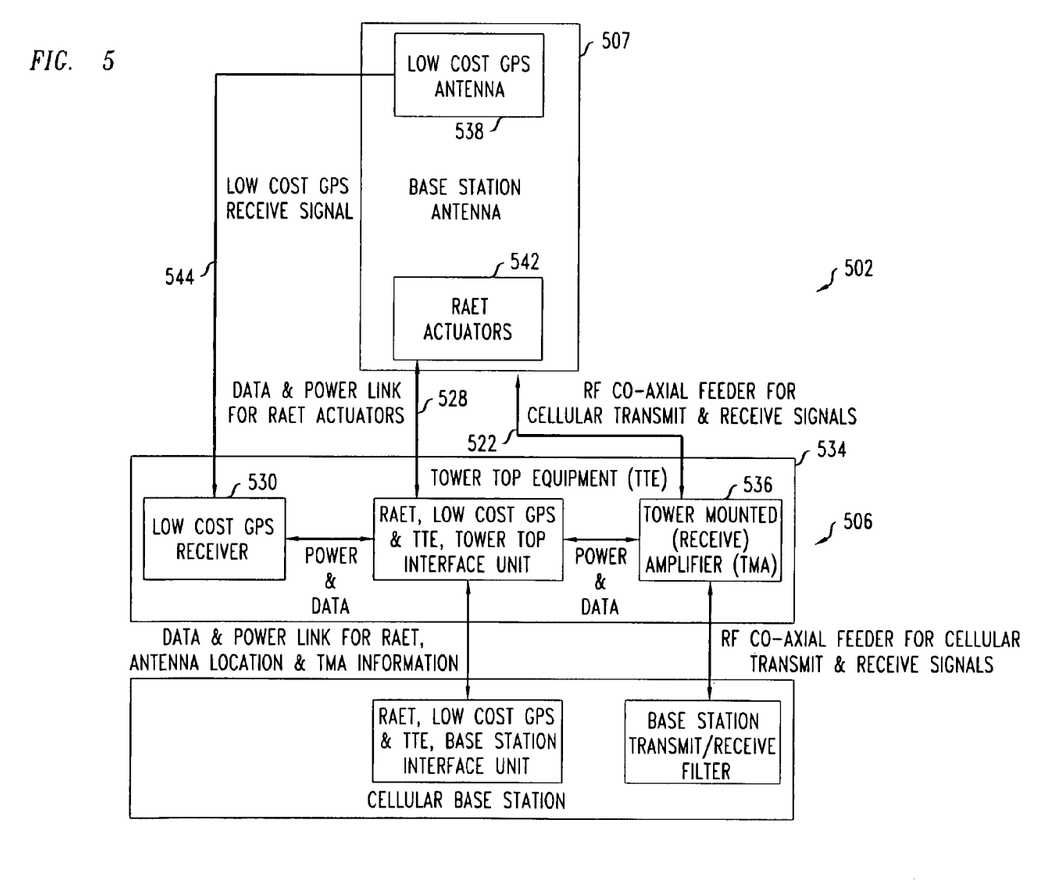
FIG. 5 is a diagram illustrating a further preferred base station in which tower top equipment includes a low cost GPS receiver having an associated antenna, that antenna being mounted in the base station antenna assembly.
Figure 6:
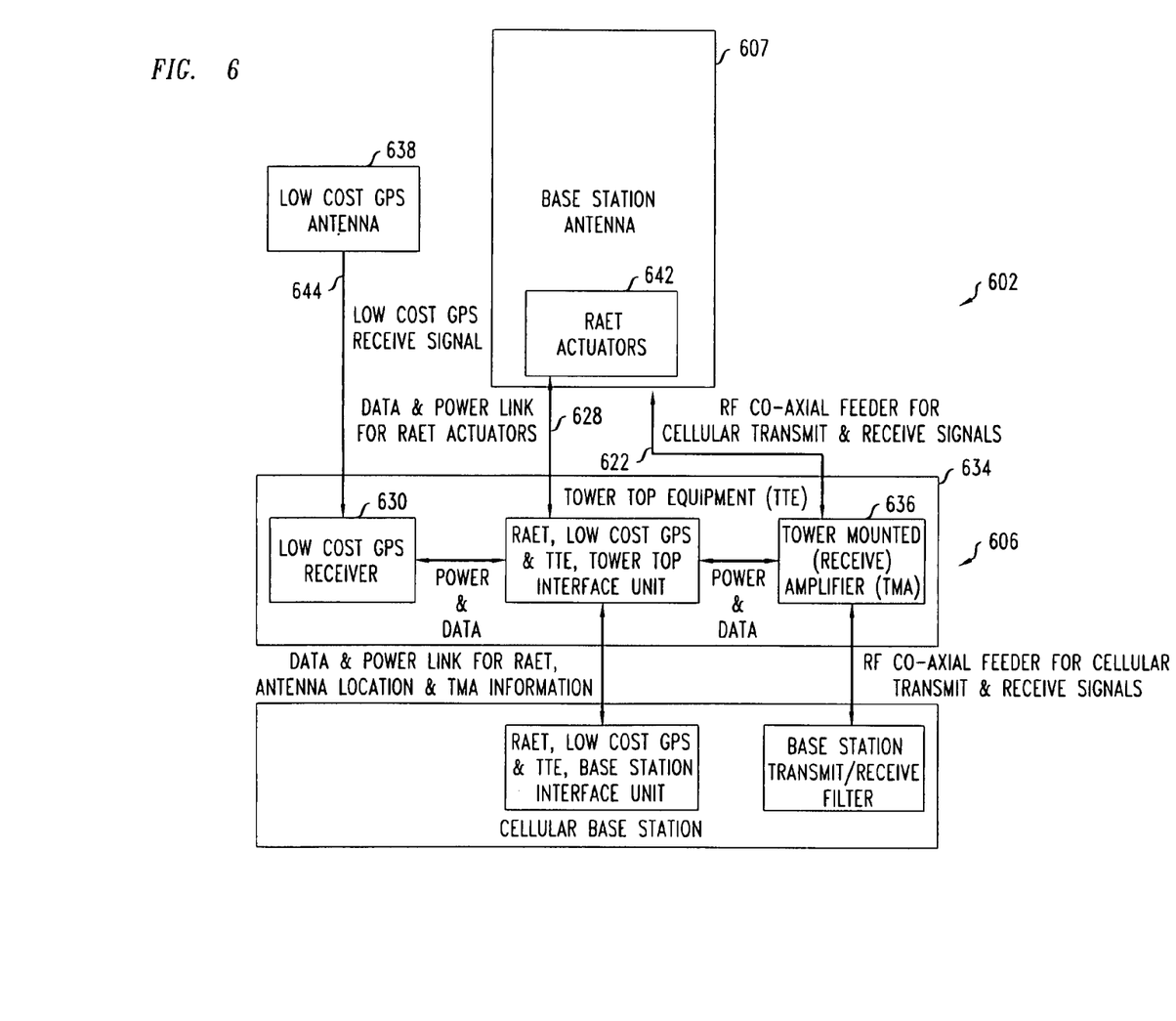
FIG. 6 is a diagram illustrating a further preferred base station in which tower top equipment contains a low cost GPS receiver with its associated antenna mounted close to the base station antenna assembly.

FIGS. 4, 5 & 6 show three further base stations (denoted 402,502,602 respectively) where the low cost GPS receiver 430,530,630 is located in an antenna assembly 406,506,606 consisting of a tower mounted assembly 434,534,634 (often referred to as Tower Top Equipment (TTE) and containing some control and processing circuitry) connected to an antenna unit 407,507,607. In these examples, the low cost GPS receiver is located in the TTE. In particular, the low cost GPS receiver is co-located with a tower mounted (receive) amplifier (TMA) 436,536,636 in the TTE. (Incidentally, the TMA provides a path for both transmitted and received signals, but only amplifies the received signals).

The three base stations shown in FIG. 4 to 6 are basically similar, however the position of antenna of the low Cost GPS Receiver varies. As shown in FIG. 4, that antenna 438 may be mounted in the Tower Top Equipment 434. Alternatively, as shown in FIG. 5, the Tower Top Equipment 534 may contain the (main part of the) low cost GPS receiver 530, but its associated antenna 538 may be mounted in the antenna unit 507. Another option, shown in FIG. 6 is that the antenna 638 is separate from, but close to, the antenna unit 607.

In these three examples shown, some control & interface electronics for the RAET is in the Tower Top Equipment (TTE), leaving only the RAET Actuators 442,542,642 in the antenna unit 407,507,607.

Referring again to FIG. 4 where the Tower Top Equipment 434 contains the Low Cost GPS Receiver 430 including its associated Antenna 438, the RF Co-axial Feeder cable 422 length between the antenna unit 407 and the Tower Top Equipment 434 must be of known length in order to be compensated for. This "offset" cannot be calculated remotely, and must thus be measured on site.

Referring again to FIG. 5 where the Tower Top Equipment 534 contains the Low Cost GPS Receiver 530, but its associated antenna 538 is mounted in the antenna unit 507, the RF Co-axial Feeder cable ("Jumper") 544 for the GPS Receive Signals of the low cost GPS receiver 530 should optimally be of the same length as the RF Co-axial Feeder cable 522 for the cellular transmit & receive signals.

Referring again to FIG. 6 where the Tower Top Equipment 634 contains the low cost GPS receiver 630, but its associated antenna 638 is mounted close to the antenna unit 607, the RF Co-axial Feeder cable 644 (Jumper) for the GPS Receive Signals (for the Low Cost GPS Receiver) should be of known length. The RF Co-axial Feeder cable 622 for the cellular transmit and receive signals should also be of known length.

In the base stations of FIGS. 3 to 6, the RAET data and power connection is by a dedicated cable 428,528,628. In some alternative embodiments (not shown) this dedicated cable is done away with and the RAET signals are sent via the RF co-axial feeder cable 422,522,622.

General

The base stations described above can be in accordance with one or more of various cellular radio standards such as Time Domain Multiple Access (TDMA), Global System for Mobiles (GSM), Code Division Multiple Access (CDMA), Wideband-Code Division Multiple Access (WCDMA), or similar standards such as Wireless Local Area Network (LAN). A Global Navigation Satellite System (GLONASS) receiver or similar can be used in the antenna assembly in place of a GPS receiver.

The invention claimed is:

1. A base station for mobile telecommunications comprising a main body and an antenna assembly mounted in a position at a distance from the main body, the antenna assembly comprising at least one antenna for transmission to and reception of signals from mobile user terminals, and the antenna assembly further comprising a receiver of satellite signals for determining position from satellite signals so as to determine the location of the antenna assembly, and wherein the receiver sends information relating to the determined location of the antenna assembly from the antenna assembly to the main body via a connection operative to also carry remote antenna electrical tilt (RAET) control signals.

2. A base station according to claim 1, in which the receiver for determining position from satellite signals is a Global Positioning System receiver.

3. A base station according to claim 1, in which the antenna assembly is mounted in use at an elevated location relative to the main body.

4. A base station according to claim 3, in which the antenna assembly is mast-, pole- or tower- mounted.

5. A base station according to claim 1, in which location of the antenna assembly is determined so as to provide location-based telecommunications services to mobile user terminals.

6. A base station according to claim 1, in which a change in the determined location of the antenna assembly of greater than a predetermined amount is an indication of damage to the base station.

7. A base station according to claim 1,
the antenna assembly further comprising a satellite signal antenna co-located with the base station antenna and connected to the satellite signal receiver.

8. A base station according to claim 7, in which said satellite signal antenna and receiver for determining position from satellite signals comprise a GPS receiving aerial incorporated within a main part of the GPS.

9. A base station according to claim 1, wherein a cable connects the main body to the antenna assembly,
the main body of the base station comprising a further receiver of satellite signals,
and the base station further comprising a comparison unit so as to compare the positions of said satellite signal receivers, or timings of output signals from said satellite signal receivers corresponding to a pulsed satellite signal, so as to estimate the length of, or time delay in conducting signals caused by, the cable connecting the main body and antenna assembly.

10. A method of determining the location of an antenna assembly, a base station for mobile telecommunications comprising a main body and the antenna assembly mounted in a position at a distance from the main body,
the antenna assembly comprising at least one antenna for transmission to and reception of signals from mobile user terminals,
and the antenna assembly further comprising a receiver, said receiver determining position from satellite signals, the receiver sending information relating to the determined location of the antenna assembly from the antenna assembly to the main body via a connection operative to also carry remote antenna electrical tilt (RAET) control signals.

11. A method according to claim 10, in which the main body of the base station comprises a second receiver of satellite signals,
the base station comparing the positions of said two receivers, or timings of output signals from the two receivers corresponding to a pulsed satellite signal, so as to estimate the length of, or time delay in conducting signals caused by, the cable connecting the main body and antenna assembly.

12. A method according to claim 10, in which location of the antenna assembly is determined so as to provide location-based telecommunications services to mobile user terminals.

13. A method according to claim 10, in which a change in the determined location of the antenna assembly of greater than a predetermined amount is an indication of damage to the base station.

14. A method of determining the location of an antenna assembly, a base station for mobile telecommunications comprising a main body and the antenna assembly mounted in a position at a distance from the main body, and connected thereto by a cable,
the antenna assembly comprising at least one antenna for transmission to and reception of signals from mobile user terminals, and the antenna assembly further comprising a first receiver, said first receiver determining position from satellite signals, the main body of the base station comprising a second receiver of satellite signals, and the base station further comprising a comparison unit, and including comparing the positions of said first and second receivers, or timings of output signals from said first and second receivers corresponding to a pulsed satellite signal, so as to estimate the length of, or time delay in conducting signals caused by, the cable connecting the main body and antenna assembly.

15. A method according to claim 14, in which location of the antenna assembly is determined so as to provide location-based telecommunications services to mobile user terminals.

16. A method according to claim 14, in which a change in the determined location of the antenna assembly of greater than a predetermined amount is an indication of damage to the base station.

17. A base station for mobile telecommunications comprising a main body and an antenna assembly mounted in a position at a distance from the main body and connected thereto by a cable, the antenna assembly comprising at least one antenna for transmission to and reception of signals from mobile user terminals, and the antenna assembly further comprising a first receiver for determining position from satellite signals so as to determine the location of the antenna assembly, the main body of the base station comprising a second receiver of satellite signals, and the base station further comprising a comparison unit so as to compare the positions of said first and second receivers, or timings of output signals from said first and second receivers corresponding to a pulsed satellite signal, so as to estimate the length of, or time delay in conducting signals caused by, the cable connecting the main body and antenna assembly.

18. A base station according to claim 17, in which location of the antenna assembly is determined so as to provide location-based telecommunications services to mobile user terminals.

19. A base station according to claim 17, in which a change in the determined location of the antenna assembly of greater than a predetermined amount is an indication of damage to the base station.

* * * * *